United States Patent
Valentin et al.

(10) Patent No.: US 7,894,120 B2
(45) Date of Patent: Feb. 22, 2011

(54) ELECTROCHEMICAL AND/OR ELECTROCONTROLLABLE DEVICE, OF THE GLAZING TYPE, HAVING VARIABLE OPTICAL AND/OR ENERGETIC PROPERTIES

(75) Inventors: Emmanuel Valentin, Le Plessis Trevise (FR); Samuel Dubrenat, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/375,045

(22) PCT Filed: Jul. 26, 2007

(86) PCT No.: PCT/FR2007/051729
§ 371 (c)(1),
(2), (4) Date: Jan. 26, 2009

(87) PCT Pub. No.: WO2008/017777
PCT Pub. Date: Feb. 14, 2008

(65) Prior Publication Data
US 2009/0323157 A1    Dec. 31, 2009

(30) Foreign Application Priority Data
Aug. 4, 2006 (FR) .................................. 06 53294

(51) Int. Cl.
*G02F 1/153* (2006.01)
*G02F 1/15* (2006.01)
(52) U.S. Cl. ...................... 359/275; 359/265
(58) Field of Classification Search ............. 204/192.29; 264/2.7; 359/265, 275; 427/109, 110, 569
See application file for complete search history.

(56) References Cited

U.S. PATENT DOCUMENTS
4,350,414 A    9/1982   Takahashi et al.

(Continued)

FOREIGN PATENT DOCUMENTS
EP    0 557 159    8/1993

(Continued)

OTHER PUBLICATIONS

English-language translation of the Written Opinion of the International Searching Authority (PCT/ISA/237) prepared in connection with PCT/FR2007/051729 (Mar. 10, 2009).*

(Continued)

*Primary Examiner*—David N Spector
(74) *Attorney, Agent, or Firm*—Oblon, Spivak, McClelland, Maier & Neustadt, L.L.P.

(57) ABSTRACT

An electrically controllable/electrochemical device, having variable optical and/or energy properties, including at least one carrier substrate including a first electronically conductive layer, a first electrochemically active layer capable of reversibly inserting ions such as cations, $H^+$, or $Li^+$, or anions, $OH^-$, or anions made of an anodic (or respectively cathodic) electrochromic material, an electrolyte layer, a second electrochemically active layer capable of reversibly inserting the ions, or made of a cathodic (or respectively anodic) electrochromic material, and a second electronically conductive layer. At least one of the electrochemically active layers capable of reversibly inserting the ions, or made of an anodic or cathodic electrochromic material, has a sufficient thickness to allow all the ions to be inserted without electrochemically disfunctioning the active layers.

15 Claims, 1 Drawing Sheet

U.S. PATENT DOCUMENTS

Figure 1:
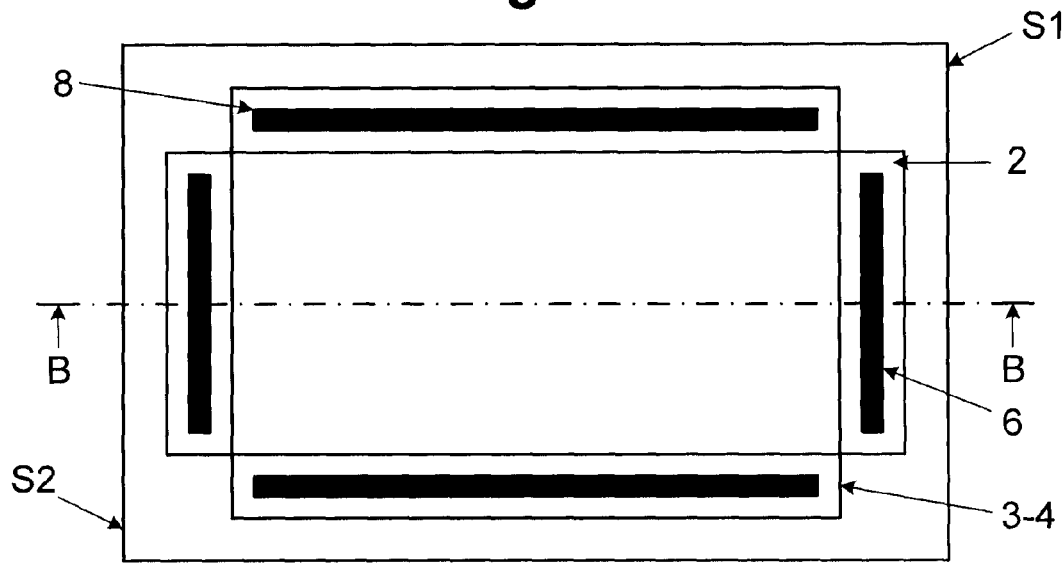

| | | |
|---|---|---|
| 4,416,516 A | 11/1983 | Beni et al. |
| 5,410,426 A | 4/1995 | Ripoche |
| 6,160,655 A | 12/2000 | Fix et al. |
| 7,652,812 B2 * | 1/2010 | Mahe et al. .................. 359/265 |
| 7,777,933 B2 * | 8/2010 | Piroux et al. ................ 359/265 |
| 2008/0190759 A1 | 8/2008 | Valentin et al. |
| 2009/0251758 A1 * | 10/2009 | Valentin et al. ............. 359/265 |
| 2010/0132988 A1 * | 6/2010 | Valentin et al. ............. 174/257 |

FOREIGN PATENT DOCUMENTS

| | | |
|---|---|---|
| EP | 0 823 653 | 2/1998 |
| WO | 00 71777 | 11/2000 |

OTHER PUBLICATIONS

U.S. Appl. No. 12/374,050, filed Jan. 16, 2009, Valentin, et al.

* cited by examiner

ELECTROCHEMICAL AND/OR ELECTROCONTROLLABLE DEVICE, OF THE GLAZING TYPE, HAVING VARIABLE OPTICAL AND/OR ENERGETIC PROPERTIES

The subject of the present invention is an electrochemical and/or electrically controllable device of the glazing type and having variable optical and/or energy properties.

There is presently an increasing demand for what is called "smart" glazing capable of adapting to the requirements of users.

As regards "smart" glazing, this may involve controlling the inflow of solar radiation through glazing mounted on the outside of buildings or of vehicles of the automobile, train or airplane type (for example a cabin window). The object is to be able to limit excess heating inside passenger compartments/rooms, but only in the case of strong sunlight.

"Smart" glazing may also involve controlling the degree of vision through it, especially so as to darken it, make it diffusing, or even to prevent any vision when this is desirable. It may relate to glazing mounted as internal partitions in rooms, trains or airplanes, or mounted as side windows in automobiles. It also relates to mirrors, used as rear-view mirrors, in order to prevent a driver from being dazzled, or indicating panels, in order for messages to appear when this is necessary, or intermittently in order to better attract attention. Glazing that may be intentionally rendered diffusing may be used when desired as projection screens.

As a variant, light may be generated by the glazing so as to control the brightness level or the color generated. There are various electrically controllable systems allowing this kind of modification in appearance/thermal properties. To modulate the light transmission or the light absorption of glazing, there are what are called "viologen" systems, such as those described in U.S. Pat. No. 5,239,406 and EP-612 826.

To modulate the light transmission and/or thermal transmission of glazing, there are also what are called "electrochromic" systems. As is known, these generally comprise two layers of electrochromic material separated by an electrolyte layer and flanked by two electronically conductive layers, the latter being combined with current leads connected to a power supply.

Each of the layers of electrochromic material can reversibly insert cations and electrons, the modification of their degree of oxidation as a result of these insertions/extractions leading to a modification in its optical and/or thermal properties. In particular, it is possible to modulate their absorption and/or their reflection at wavelengths in the visible and/or the infrared.

It is customary to place electrochromic systems in three categories:

that in which the electrolyte is in the form of a polymer or a gel. For example, a protonically conductive polymer, such as those described in patents EP-253 713 or EP-670 346, or a conductive polymer conducting by lithium ions, such as those described in patents EP-382 623, EP-518 754 and EP-532 408, the other layers of the system generally being of inorganic nature;

that in which the electrolyte and the other layers of the stack are of inorganic nature. This category is often denoted by the term "all solid-state" system, examples of which may be found in patents EP-867 752, EP-831 360 and patents WO 00/57243 and WO 00/71777; and that in which all of the layers are based on polymers, which category is often denoted by the term "all polymer" system.

The present invention relates to "all solid-state" electrochromic systems.

All these systems have in common the need to be provided with current leads for supplying the electronically conductive layers on either side of the active layer or of the various active layers of the system.

These current leads apply a voltage and allow a current to flow through the stack, the flow of the current having to ensure switching from a colored state to a bleached state, and vice versa.

It will be understood that switching from one state to another results either in darkening or in lightening of the glazing thus controlled. The current trend is to have systems which, under the effect of a power supply, produce rapid and uniform effects, the contrast of which between the two states (bleached/colored) is as high as possible, so as to achieve an almost opaque system in the colored state, the contrast being defined as the ratio of the light transmission ($T_L$) in the bleached state to the light transmission in the colored state.

To do this, several solutions of the prior art are known:

the quantity of charge or the voltage level across the terminals of the current leads is increased, the major drawback of this solution being the fact that generally it results in the system being less robust;

optically more active layers are used, extending the light transmission ranges achievable. The development of such layers may require considerable research effort and modification or replacement of existing material; and at least two complete systems mounted in a multiple glazing configuration are juxtaposed (the reader may refer to U.S. Pat. No. 5,076,673). This solution minimizes the chances of a defect present in one of the systems being opposite a defect present in the other system. The major drawback of this solution lies in the fact that a power supply is required for each of the systems, thereby making it costly. In addition, juxtaposing the systems makes the overall structure heavy, given that at least four substrates are needed for the arrangement. This multiple, especially double, glazing arrangement necessarily increases the number of optical interfaces and therefore leads to a reduction in the light transmission in the bleached state. This double-glazing arrangement of the "building" type cannot be transposed to the automotive field. It may be noted that a laminated arrangement, commonplace in the automotive field, is possible only with substantially flat substrates and with a limited number of substrates (two or three). This is almost impossible with highly curved substrates, most particularly when there are two or even three substrates, which generally results in the risk of optical distortion.

The object of the present invention is therefore to alleviate the solutions of the prior art by proposing a system that can be controlled by a single power supply and the operating performance of which is at least identical to that of two juxtaposed systems.

One subject of the invention is an electrically controllable/electrochemical device, having variable optical and/or energy properties of the "all solid-state" electrochromic type of TC1/EC1/EL/EC2/TC2 structure, comprising at least one carrier substrate provided with a first electronically conductive layer, a first electrochemically active layer capable of reversibly inserting ions such as cations, e.g. $H^+$ and $Li^+$, or anions, e.g. $OH^-$, especially made of an anodic (or respectively cathodic) electrochromic material, an electrolyte layer, a second electrochemically active layer capable of reversibly inserting said ions, especially made of a cathodic (or respectively anodic) electrochromic material, and a second electronically conductive layer, characterized in that at least one of the electrochemically active layers capable of reversibly inserting said ions, especially made of an anodic or cathodic electrochromic material, has a sufficient thickness to allow all the ions to be inserted without electrochemically disfunctioning said active layers, in that the layer EL having an electrolyte function comprises at least one layer based on a material chosen from tantalum oxide, tungsten oxide, molybdenum oxide, antimony oxide, niobium oxide, chromium oxide, cobalt oxide, titanium oxide, tin oxide, nickel oxide, zinc oxide optionally alloyed with aluminum, zirconium oxide, aluminum oxide, silicon oxide optionally alloyed with aluminum, silicon nitride optionally alloyed with aluminum or with boron, boron nitride, aluminum nitride, vanadium oxide optionally alloyed with aluminum, and tin zinc oxide, at least one of these oxides being optionally hydrogenated, or nitrided, in that each electroactive layer EC1 or EC2 comprises at least one of the following compounds: oxides of tungsten W, niobium Nb, tin Sn, bismuth Bi, vanadium V, nickel Ni, iridium Ir, antimony Sb and tantalum Ta, alone or as a mixture, and optionally including an additional metal such as titanium, rhenium or cobalt, and in that the thickness of the layer EC1 is between 70 and 250 nm and preferably between 150 and 220 nm.

Thanks to the presence of a sufficient thickness of electrochromic material, it is possible to obtain, for a lower cost, a system possessing a high degree of darkening.

In preferred embodiments of the invention, one or more of the following arrangements may optionally be furthermore employed:
  the thickness of the layer EC2 is between 400 and 1500 nm, preferably between 700 and 1300 nm and even more preferably between 800 and 1200 nm;
  the quantity of charge exchanged during an operating cycle of said device is between 25 mC/cm$^2$ and 80 mC/cm$^2$;
  the electronically conductive layer TC1 or TC2 is of the metallic type or of the TCO (transparent conductive oxide) type made of $In_2O_3$:Sn (ITO), $SnO_2$:F or ZnO:Al or to be a multilayer of the TCO/metal/TCO type, this metal being chosen in particular from silver, gold, platinum and copper, or is a multilayer of the NiCr/metal/NiCr type, the metal being also chosen in particular from silver, gold, platinum and copper; and
  the contrast values obtained are between 9 and 10 000 and preferably between 15 and 4000.

According to another aspect, the subject of the invention is electrochromic glazing, which is characterized in that it comprises the electrochemical device having in particular a variable light and/or energy transmission and/or reflection, with the transparent or partially transparent substrate or at least some of the transparent or partially transparent substrates made of plastic, preferably mounted as multiple and/or laminated glazing, or as double glazing.

According to yet another aspect, the subject of the invention is a process for manufacturing the electrochemical device as described above, in which at least one of the layers of the electrochemical device is deposited by a vacuum technique, of the sputtering type, optionally magnetron sputtering, by thermal or electron-beam evaporation, by laser ablation, by CVD, optionally plasma-enhanced or microwave-enhanced CVD, or by an atmospheric-pressure technique, in particular by depositing layers by sol-gel synthesis, especially of the dip coating, spray coating or laminar flow coating type.

Finally, according to yet another aspect, the subject of the invention is the use of the abovementioned glazing as glazing for buildings, glazing for automobiles, glazing for commercial or mass transport vehicles, whether by rail, sea or air, in particular cabin windows, rear-view and other mirrors, display screens and touch displays and obturators for image acquisition devices.

Within the context of the invention, the term "lower electrode" is understood to mean the electrode lying closest to the carrier substrate taken as reference, on which electrode at least some of the active layers (for example all of the active layers in an "all solid-state" electrochromic system) are deposited. The "upper electrode" is the electrode deposited on the other.

Within these thickness ranges, the electrode remains transparent, that is to say it has a low light absorption in the visible. However, it is not excluded to have considerably thicker layers (especially if the electroactive system of the electrochromic type operates in reflection rather than in transmission) or thinner layers (especially when they are associated in the electrode with another type of conductive layer, for example a metallic layer). As mentioned above, the invention may apply to various types of electrochemical or electrically controllable systems.

More particularly, it relates to electrochromic systems, especially "all solid-state" ones.

The electrochromic systems, or glazing, to which the invention may apply have been described in the aforementioned patents. They may comprise at least two carrier substrates between which there are stacks of functional layers, each comprising in succession at least a first electronically conductive layer, an electrochemically active layer capable of reversibly inserting ions such as $H^+$, $Li^+$ and $OH^-$, of the anodic or respectively cathodic electrochromic material type, an electrolyte layer, a second electrochemically active layer capable of reversibly inserting ions such as $H^+$, $Li^+$ and $OH^-$, of the cathodic or respectively anodic electrochromic material type, and a second electronically conductive layer (the term "layer" should be understood to mean a single layer or a superposition of several layers, whether these are continuous or discontinuous).

The invention also relates to the incorporation of the electrochemical devices described in the preamble of the present application in glazing, whether operating in reflection (a mirror) or in transmission. The term "glazing" should be understood in the broad sense and encompass any essentially transparent material made of glass and/or a polymer material (such as polycarbonate PC or polymethyl methacrylate PMMA). The carrier substrates and/or counter-substrates, that is to say the substrates flanking the active system, may be rigid, flexible or semiflexible. This glazing may be used as glazing for buildings, glazing for automobiles, glazing for commercial or mass transport vehicles, whether by rail, sea or air, in particular cabin windows, and rear-view and other mirrors. This glazing, in particular having a variable light and/or energy transmission and/or reflection, with the transparent or partially transparent substrate or at least some of the transparent or partially transparent substrates made of plastic or glass, is preferably mounted as multiple and/or laminated glazing, or as double glazing.

The invention also relates to the various applications that may be found for these devices as glazing or mirrors. These may be glazing for buildings, especially external glazing, internal partitions or glazed doors. They may also be internal windows, roofs or partitions in transport means, such as trains, airplanes, automobiles or ships. They may also be display screens, such as projection screens, television or computer screens, and touch-sensitive screens, commonly called touch displays. The glazing may also be used to make spectacles or camera lenses, or else for protecting solar panels.

Figure 2:
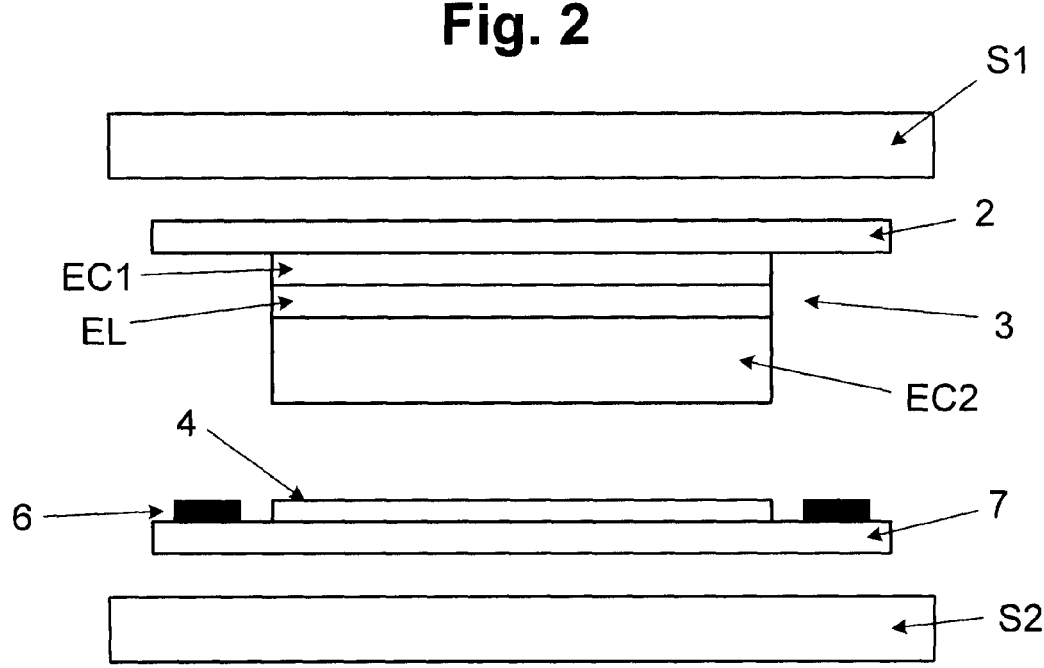

The invention will now be described in greater detail by means of nonlimiting examples and the following figures:

FIG. 1: a schematic view of an electrochromic cell according to the invention; and FIG. 2 illustrates is a cross-sectional schematic view of FIG. 1.

FIG. 2 is intentionally highly schematic and is not necessarily to scale, in order to make it easier to examine it. It represents, in cross section, an "all solid-state" electrochromic device according to the teachings of the invention, comprising in succession:

a clear soda-lime-silica glass S1 with a thickness of 2.1 mm;

a lower electronically conductive layer 2 comprising a multilayer stack of the ITO/ZnO:Al/Ag/ZnO:Al/ITO type with respective thicknesses of 15 to 20 nm for the ITO, 60 to 80 nm for the ZnO:Al, 3 to 15 nm for the silver, 60 to 80 nm for the ZnO:Al, 15 to 20 nm for the ITO, or is based on ITO (tin-doped indium oxide) with a thickness of 500 nm, deposited hot;

a first electrochromic system 3, the structure of which will be described later;

an upper electronically conductive layer 4 based on ITO or on $SnO_2$:F, or else as a variant an upper electronically conductive layer comprising other conductive elements. The electronically conductive layer may more particularly be combined with a layer that is more conductive than it, and/or with a plurality of conducting strips or wires. For more details, the reader may refer to patent WO-00/57243 for the implementation of such multicomponent electronically conductive layers. A preferred embodiment of this type of electronically conductive layer consists in applying, to the ITO layer (optionally surmounted by one or more other conductive layers), a plurality of conducting strips or an array of conducting wires 6 embedded in the surface of a polymer sheet 7 acting as lamination interlayer and allowing the upper electronically conductive layer associated with the electrochromic stack to be electrically powered; and a clear soda-lime-silica glass S2 with a thickness of 2.1 mm.

The electrochromic system 3 comprises:

a first layer EC1 of anodic electrochromic material made of hydrated iridium oxide 70 to 250 nm in thickness or made of hydrated nickel oxide 200 to 400 nm in thickness, whether alloyed or not with other metals (as a variant, this layer may be replaced with a layer of anodic electrochromic material made of nickel oxide 200 to 400 nm in thickness, whether or not alloyed with other metals);

a tungsten oxide layer 100 nm in thickness;

a second layer made of hydrated tantalum oxide or hydrated silica oxide or hydrated zirconium oxide 100 nm in thickness, the latter two layers forming a layer EL with an electrolyte function; and a second layer EC2 of cathodic electrochromic material based on tungsten oxide $WO_3$ 400 to 1200 nm in thickness.

All the layers were deposited by magnetron sputtering. As a variant, they could be obtained by thermal or electron-beam evaporation, by laser ablation, by CVD, optionally plasma-enhanced or microwave-enhanced CVD, or by an atmospheric-pressure technique, especially by depositing layers by sol-gel synthesis, especially dip coating, spray coating or laminar flow coating.

The grooves may be cut into the active stack 3, over all or part of its periphery, by mechanical means or by etching or by laser radiation, optionally pulsed laser radiation, so as to limit the peripheral electrical losses, as described in French application FR-2 781 084.

Moreover, the glazing shown in FIGS. 1, 2 incorporates (but not shown in the figures) a first peripheral seal in contact with faces 2 and 3 (2 and 3 being conventionally the numbering of the internal faces of the substrates S1 and S2), this first seal being designed to form a barrier to external chemical attack.

A second peripheral seal is in contact with the edge of S1, the edge of S2 and with faces 1 and 4 (1 and 4 being conventionally the numbering of the external faces of the substrates S1 and S2) so as to form a barrier, a means of mounting with the transport means, sealing between the inside and the outside, an esthetic function or a means of incorporating reinforcing elements.

The electrochromic device described above constitutes example 1. The electrochromic device of this example 1 was connected to a power supply so as to allow it to be switched between a colored state and a bleached state, and vice versa.

Given below are the contrast values achieved for various stack configurations.

In a first example of a configuration that constitutes an example according to the prior art, with which it will be possible to compare the following examples: the association, on a soda-lime-silica substrate covered with an overall thickness of 2.1 mm of ITO, of an electrochromic system comprising:

an anodic first layer EC1 of electrochromic material made of hydrated iridium oxide 60 to 90 nm, preferably 85 nm, in thickness;

a tungsten oxide layer 100 nm in thickness;

a second layer of hydrated tantalum oxide, this layer EL having an electrolyte function; and a cathodic second layer EC2 of electrochromic material based on tungsten oxide $WO_3$ 350 to 390 nm, preferably 380 nm, in thickness, makes it possible to switch the glazing between a bleached state characterized by a light transmission ($T_L$) of 55% and a colored state characterized by a $T_L$ of 2.5%. The contrast associated with this glazing is 22 for a quantity of exchanged charge of 25 to 30 $mC/cm^2$.

Within the context of the invention, the quantity of charge flowing during the bleaching/bleaching cycles between the electroactive layers corresponds to the amount of charge per unit area of the stack, normalized to a given active layer thickness and linearly increasing with the thickness of said layer.

In a second configuration example:

the association, on a soda-lime-silica substrate coated with an overall thickness of 2.1 mm of ITO, of an electrochromic system comprising:

an anodic first layer EC1 of electrochromic material made of hydrated iridium oxide 80 to 120 nm, preferably 105 nm, in thickness;

a tungsten oxide layer 100 nm in thickness;

a second layer of hydrated tantalum oxide, this layer EL having an electrolyte function; and a cathodic second layer EC2 of electrochromic material based on tungsten oxide $WO_3$ with a thickness of 400 to 600 nm, preferably 500 nm, makes it possible to switch the glazing between a bleached state characterized by a light transmission ($T_L$) of 50% and a colored state characterized by a $T_L$ of 1%. The contrast associated with this glazing is 50 for a quantity of exchanged charge of 33 to 40 mC/cm$^2$.

In a third configuration example:

the association, on a soda-lime-silica substrate coated with an overall thickness of 2.1 mm of ITO, of an electrochromic system comprising:
- an anodic first layer EC1 of electrochromic material made of hydrated iridium oxide 150 to 300 nm, preferably 210 nm, in thickness;
- a tungsten oxide layer 100 nm in thickness;
- a second hydrated tantalum oxide layer, this layer EL having an electrolyte function; and
- a cathodic second layer EC2 of electrochromic material based on tungsten oxide WO$_3$ 800 to 1500 nm, preferably 1000 nm, in thickness, makes it possible to switch the glazing between a bleached state characterized by a light transmission ($T_L$) of 40% and a colored state characterized by a $T_L$ of 0.01%. The contrast associated with this glazing is 4000 for a quantity of exchanged charge of 66 to 80 mC/cm$^2$.

If examples 2 and 3 are compared with example 1, it may be seen that, as soon as the thickness of the layer EC2 is significantly increased, it is possible to obtain high contrast values, while still maintaining a quantity of exchanged charge substantially of the same order of magnitude.

The invention claimed is:

1. An electrically controllable/electrochemical device having all solid-state electrochromic components comprising:
   - at least one carrier substrate;
   - a first electronically conductive layer;
   - a first electrochemically active layer capable of reversibly inserting ions, cations, H$^+$, or Li$^+$, or anions, or OH$^-$, or anions and made of an anodic or respectively cathodic electrochromic material;
   - an electrolyte layer having an electrolyte function;
   - a second electrochemically active layer capable of reversibly inserting the ions, or made of a cathodic or respectively anodic electrochromic material; and
   - a second electronically conductive layer,
   - wherein at least one of the first and second electrochemically active layers has a sufficient thickness to allow all the ions to be inserted without electrochemically disfunctioning the active layers, a thickness of the first electrochemically active layer being between 70 and 250 nm, and a thickness of the second electrochemically active layer being between 400 and 1500 nm,
   - wherein the electrolyte layer comprises at least one layer based on a material chosen from tantalum oxide, tungsten oxide, molybdenum oxide, antimony oxide, niobium oxide, chromium oxide, cobalt oxide, titanium oxide, tin oxide, nickel oxide, zinc oxide, zinc oxide alloyed with aluminum, zirconium oxide, aluminum oxide, silicon oxide, silicon oxide alloyed with aluminum, silicon nitride, silicon nitride alloyed with aluminum or with boron, boron nitride, aluminum nitride, vanadium oxide, vanadium oxide alloyed with aluminum, and tin zinc oxide,
   - wherein each electrochemically active layer comprises at least one of the following compounds: oxides of tungsten W, niobium Nb, tin Sn, bismuth Bi, vanadium V, nickel Ni, iridium Ir, antimony Sb, and tantalum Ta, alone or as a mixture, and
   - wherein a quantity of charges exchanged during an operation cycle of the device is between 25 mC/cm$^2$ and 80 mC/cm$^2$, and a light transmittance in a bleached state of the device is higher than 40%.

2. The device as claimed in claim 1, wherein the quantity of charge exchanged during an operating cycle of the device is between 25 mC/cm$^2$ and 80 mC/cm$^2$.

3. The device as claimed in claim 1, wherein one of the electronically conductive layers is of metallic type or of TCO (transparent conductive oxide) type made of In$_2$O$_3$:Sn (ITO), SnO$_2$:F or ZnO:Al.

4. The device as claimed in claim 1, wherein contrast values obtained are between 9 and 10 000.

5. The device as claimed in claim 1, wherein the thickness of the first electrochemically active layer is between 150 and 220 nm.

6. The device as claimed in claim 1, wherein the thickness of the second electrochemically active layer is between 700 and 1300 nm.

7. The device as claimed in claim 1, wherein contrast values obtained are between 15 and 4000.

8. The device as claimed in claim 1, wherein the electrochemically active layer comprises an additional metal including at least one of titanium, rhenium, and cobalt.

9. The device as claimed in claim 1, wherein the electrolyte layer is hydrogenated or nitrided.

10. The device as claimed in claim 1, wherein one of the electronically conductive layers is a multilayer of TCO/metal/TCO type or of NiCr/metal/NiCr type, the metal being chosen from silver, gold, platinum and copper.

11. An electrochromic glazing, comprising:
    - the electrochemical device as claimed in claim 1, having a variable light transmission, energy transmission, or reflection, with a transparent or partially transparent substrate or at least some of the transparent or partially transparent substrate being made of plastic.

12. The device as claimed in claim 1, wherein the thickness of the second electrochemically active layer is between 800 and 1200 nm.

13. An electrochromic glazing, comprising:
    - the electrochemical device as claimed in claim 1, having a variable light transmission, energy transmission, or reflection, with a transparent or partially transparent substrate or at least some of the transparent or partially transparent substrate mounted as a multiple glazing, a multiple and laminated glazing, or a laminated glazing.

14. The glazing as claimed in claim 13, wherein the glazing is at least one of a glazing for buildings, a glazing for automobiles, a glazing for commercial or mass transport vehicles, whether by rail, sea or air, a glazing for cabin windows, a glazing for rear-view and other mirrors, display screens and touch displays, or obturators for image acquisition devices.

15. A process for manufacturing an electrochemical device having all solid-state electrochromic components, the process comprising:
    - depositing on a carrier substrate plural layers of said electrochromic components including a first electrochemically conductive layer, a first electrochemically active layer, an electrolytic layer, a second electrochemically active layer, and a second electrochemically conductive layer,
    - wherein at least one of the plural layers of the electrochemical device is deposited by a vacuum technique of sputtering type, magnetron sputtering, thermal or electron-beam evaporation, laser ablation, CVD, plasma-enhanced or microwave-enhanced CVD, an atmospheric-pressure technique, sol-gel synthesis, dip coating, spray coating, or laminar flow coating, and
    - wherein said depositing of the first electrochemically conductive layer deposits a layer having a thickness between 70 and 250 nm.

* * * * *